United States Patent
Delibie (10) Patent No.: US 11,150,323 B2
(45) Date of Patent: Oct. 19, 2021

(54) METHOD FOR GEOGRAPHICALLY LOCATING A SIGNAL-EMITTING DEVICE

(71) Applicant: KERLINK, Thorigne-Fouillard (FR)

(72) Inventor: Yannick Delibie, Thorigne-Fouillard (FR)

(73) Assignee: KERLINK, Thorigne-Fouillard (FR)

(*) Notice: Subject to any disclaimer, the term of this patent is extended or adjusted under 35 U.S.C. 154(b) by 0 days.

(21) Appl. No.: 16/961,034

(22) PCT Filed: Jan. 14, 2019

(86) PCT No.: PCT/FR2019/050072
§ 371 (c)(1),
(2) Date: Jul. 9, 2020

(87) PCT Pub. No.: WO2019/141931
PCT Pub. Date: Jul. 25, 2019

(65) Prior Publication Data
US 2020/0371191 A1    Nov. 26, 2020

(30) Foreign Application Priority Data

Jan. 22, 2018 (FR) ...................................... 1850485

(51) Int. Cl.
*G01S 5/02* (2010.01)
(52) U.S. Cl.
CPC .......... *G01S 5/0263* (2013.01); *G01S 5/0252* (2013.01)
(58) Field of Classification Search
CPC .............................. G01S 5/0263; G01S 5/0252
USPC ............ 455/404.2, 414.1–414.2, 426.1, 448, 455/456.1–457, 524, 552.1
See application file for complete search history.

(56) References Cited

U.S. PATENT DOCUMENTS

| | | | | |
|---|---|---|---|---|
| 8,265,651 | B2 * | 9/2012 | Amidi | G01S 5/0009 455/456.1 |
| 9,652,955 | B1 | 5/2017 | Ray et al. | |
| 2003/0013146 | A1 * | 1/2003 | Werb | G01V 15/00 435/9 |
| 2010/0138184 | A1 | 6/2010 | Fernandez et al. | |
| 2013/0267253 | A1 * | 10/2013 | Case | H04W 4/021 455/456.3 |
| 2015/0379860 | A1 * | 12/2015 | Vardi | G08B 21/0275 340/8.1 |

OTHER PUBLICATIONS

International Search Report for corresponding PCT application No. PCT/FR2019/050072, dated Apr. 18, 2019.

* cited by examiner

*Primary Examiner* — Michael Y Mapa
(74) *Attorney, Agent, or Firm* — Notaro, Michalos & Zaccaria P.C.

(57) ABSTRACT

A method for geolocating a signal-transmitting device, the geolocation method including: supplying first data of reception by a plurality of first reception stations of a first radio signal transmitted at a first frequency, calculating a first geographic position of the signal-transmitting device, detecting that the geographic position of the signal-transmitting device is included in a predefined second geographic zone, transmitting a signal instructing transmission of a second radio signal, supplying second data of reception of the second radio signal by a plurality of second reception stations according to a second frequency, and calculating a second geographic position of the signal-transmitting device.

14 Claims, 3 Drawing Sheets

METHOD FOR GEOGRAPHICALLY LOCATING A SIGNAL-EMITTING DEVICE

TECHNICAL FIELD

The invention relates to the field of the methods for geolocating a radio signal-transmitting device, notably signal-transmitting devices belonging to the field of the internet of things. More particularly, the invention relates to the geolocation of a signal-transmitting device in the context of a network comprising a plurality of data concentration gateways.

TECHNOLOGICAL BACKGROUND

The internet of things consists in allowing objects to communicate data automatically with a wireless network. For example, a water meter equipped with a communication module can automatically communicate a water reading to the company managing the billing of water consumption.

Message concentration gateways, also called reception stations, are designed to receive and transmit data from and to communication modules present in their coverage zone and to relay these data to equipment responsible for processing them, for example servers accessible on a network based on the IP protocol (Internet Protocol).

A number of radio access technologies are available for implementing networks of communication modules. Purely illustrative and nonlimiting examples of the technologies that can be cited include LoRa™, Sigfox™ or even WM-Bus (Wireless Meter Bus), which are based notably on different modulation types. These technologies have the common feature of offering long range communications which
make it possible to reduce the number of gateways by increasing the coverage thereof.

In some situations, it may be necessary to geolocate certain objects transmitting radio signals. That can for example be the case for transmitters associated with mobile objects such as product transport pallets or the like. It is known practice to use, for that, satellite guidance (GPS). However, the use of components allowing location via GPS can be complex, costly and energy-intensive for the signal-transmitting device and is not therefore suitable for all uses or for all the signal-transmitting devices.

Also known, for example from the document US2010/0138184 A1, is a geolocation method based on triangulation using reception data of a radio signal transmitted by a signal-transmitting device at a plurality of radio receivers. Such reception data are, for example, the date of reception of the radio signal or even the power of the radio signal received by the different receivers. However, such a triangulation-based method offers an accuracy that is dependent on the radio access technology used by the signal. Thus, in the case of a long range communication technology, the geolocation accuracy is limited and does not always make it possible to geolocate the signal-transmitting device with the requisite accuracy.

There is therefore a need for a method for geolocating a radio signal-transmitting device that offers low complexity, reduced consumption and an adequate degree of accuracy.

SUMMARY

The invention makes it possible to meet these needs. One idea on which the invention is based is to allow the geolocation of a radio signal-transmitting device with a satisfactory degree of accuracy. One idea on which the invention is based is to geolocate a radio signal-transmitting device using an infrastructure of a simple communication network, of low energy consumption and offering a degree of accuracy suited to the needs. In particular, one idea on which the invention is based is to adapt the degree of accuracy of geolocation to the geographic zones in which said signal-transmitting device is located.

For that, the invention provides a method for geolocating a signal-transmitting device, the geolocation method comprising:

supplying first reception data, said first reception data resulting from the reception, by a plurality of first reception stations, of a first radio signal transmitted at a first frequency by the signal-transmitting device, said first reception stations defining a first geographic coverage zone, calculating a first geographic position of the signal-transmitting device in the first geographic coverage zone from the first reception data, detecting that the geographic position of the signal-transmitting device is included in a predefined second geographic zone, the second geographic zone being included in the first geographic coverage zone, transmitting a transmission instruction signal to the signal-transmitting device, the transmission instruction signal being intended to trigger the transmission of a second radio signal at a second frequency distinct from the first frequency by the signal-transmitting device, supplying second reception data, said second reception data resulting from the reception of the second radio signal by a plurality of second reception stations, said second reception stations being able to receive a radio signal at the second frequency transmitted from the second geographic zone, and calculating a second geographic position of the signal-transmitting device in the second geographic zone from the second reception data.

By virtue of these features, it is possible to adapt the degree of accuracy and therefore the infrastructure allowing the geolocation of the signal-transmitting device as a function of the geographic zones in which said signal-transmitting device is located. Thus, when the signal-transmitting device is in a zone not requiring a high degree of accuracy, for example traveling between two storage zones, the geolocation by the first reception stations offers an infrastructure that is suitable both from a point of view of the range and with respect to the desired level of geolocation accuracy and, when the transmitting device enters into a zone requiring a higher degree of accuracy, the geolocation by the second reception station allows, for this zone, an increased degree of accuracy requiring an infrastructure suitable only for said zone.

By virtue of these features, it is also possible to limit the energy consumption of the signal-transmitting device. In fact, the transmission of the second signal by the signal-transmitting device is activated only when the signal-transmitting device is in the second geographic zone, that is to say in a zone in which said second signal can be received by the second reception stations. Thus, the transmitting device does not consume energy to transmit the second radio signal as long as it is not located by means of the first radio signal as being in the second geographic zone.

According to other advantageous embodiments, such a geolocation method can have one or more of the following features.

According to one embodiment, prior to the transmission of the transmission instruction signal, the second reception stations are in an inactive state in which said second reception stations are unable to receive a radio signal at the second frequency transmitted from the second zone, the method further comprising, prior to the transmission of the transmission instruction signal:

transmitting an activation signal for the second reception stations to activate the second reception stations so that said second reception stations are configured to receive a radio signal at the second frequency transmitted from the second geographic zone.

By virtue of these features, it is possible to limit the energy consumption of the second reception stations. In fact, said second reception stations are activated and consume energy only when the signal-transmitting device is geolocated in the second geographic zone by means of the first radio signal, that is to say in the zone in which second reception stations are able to receive the second radio signal.

According to one embodiment,
the predefined second geographic zone comprises a plurality of geographic sub-zones,
the plurality of second reception stations comprises a plurality of groups of second reception stations, each group of second reception stations being able to receive a radio signal at the second frequency transmitted from one said respective geographic sub-zone, and
the step of detecting that the geographic position of the signal-transmitting device is included in the predefined second geographic zone comprises detecting that the geographic position of the signal-transmitting device is included in a given geographic sub-zone of the plurality of geographic sub-zones,
the second reception data result from the reception of the second radio signal by a given group of second reception stations able to receive a radio signal transmitted at the second frequency in said given geographic sub-zone.

By virtue of these features, it is possible to geolocate the signal-transmitting device in several joined geographic zones in which different groups of second reception stations are installed. Thus, it is possible to geolocate the signal-transmitting device by means of the several distinct groups of second stations when the signal-transmitting device is moving in the different sub-zones of the second geographic zone.

According to one embodiment, prior to the transmission of the transmission instruction signal, the second reception stations are in an inactive state in which said second reception stations are unable to receive a radio signal at the second frequency transmitted from the second geographic zone, the method further comprising, prior to the transmission of the transmission instruction signal and after the detection that the geographic position of the signal-transmitting device is included in the given geographic sub-zone:

transmitting an activation signal for the second reception stations of the given group of second reception stations so that said second reception stations are configured to receive the second radio signal at the second frequency.

By virtue of these features, only the second reception stations of the group of second reception stations able to receive the second signal in the given geographic sub-zone are activated, thus limiting the energy consumption of the infrastructure.

According to one embodiment, the method further comprises, after the calculation of the second geographic position of the signal-transmitting device:

detecting that the geographic position of the signal-transmitting device is situated outside of said given geographic sub-zone,
transmitting a deactivation signal for the second reception stations of the given group of second reception stations so that said second reception stations are rendered inactive.

By virtue of these features, the second reception stations are deactivated and therefore no longer consume energy to receive the second radio signal when said 10 second radio signal is transmitted from a sub-zone other than the sub-zone in which said second reception stations are not able to receive the second radio signal.

According to one embodiment, the method further comprises, after the calculation of the second geographic position of the signal-transmitting device:

detecting that the geographic position of the signal-transmitting device is situated outside of the second geographic zone,
transmitting an end of transmission instruction signal to the signal-transmitting device to interrupt the transmission of the second radio signal at the second frequency by the signal-transmitting device.

By virtue of these features, the energy consumption of the signal-transmitting device is reduced. In fact, when the signal-transmitting device is no longer in a zone allowing it to be geolocated by means of the second reception stations, the signal-transmitting device ceases to consume energy to transmit the second signal.

According to one embodiment, the method further comprises:

detecting that the geographic position of the signal-transmitting device is situated outside of the second geographic zone,
transmitting a deactivation signal for the second reception stations so that said second reception stations are inactive.

By virtue of these features, the second reception stations are deactivated and therefore no longer consume energy to receive the second radio signal when the signal-transmitting device is outside of said second geographic zone.

According to one embodiment, the reception data of the first signal comprise, for each first reception station having received the first radio signal, a datum of identification of said first radio signal, a datum of date of reception of said first radio signal and a datum of position of said first reception station.

According to one embodiment, the reception data of the first radio signal further comprise a datum of intensity of reception of said first radio signal.

According to one embodiment, the reception data of the second signal comprise, for each second reception station of the plurality of second reception stations having received the second radio signal, a datum of identification of said second radio signal, a datum of date of reception of said second radio signal and a datum of position of the second reception station.

According to one embodiment, the reception data of the second radio signal further comprise, for each second reception station, an angle of reception and an intensity of reception of said second radio signal.

According to one embodiment, the first frequency is lower than the second frequency.

According to one embodiment, the first radio signal is a frame of a LoRa communication protocol.

According to one embodiment, the first frequency is included in the 433 MHz, 868 MHz and 915 MHz group of frequencies.

According to one embodiment, the second radio signal is a frame of a UWB communication protocol.

According to one embodiment, the second frequency is included between 3 GHz and 10 GHz, preferably between 6 Ghz and 8 GHz.

According to one embodiment, the invention also provides a system for geolocating a signal-transmitting device, the geolocation system comprising:
- a plurality of first reception stations, said first reception stations defining a first geographic coverage zone, said first reception stations being configured to receive a first radio signal transmitted by the signal-transmitting device at a first frequency and from the first geographic coverage zone, the first reception stations being configured to generate first reception data resulting from the reception of said first radio signal,
- a plurality of second reception stations, said second reception stations being configured to receive a second radio signal transmitted by the signal-transmitting device at a second frequency distinct from the first frequency and from a predefined second geographic zone, the second geographic zone being included in the first geographic coverage zone, the second reception stations being configured to generate second reception data resulting from the reception of the second radio signal,
- a communication network, the first reception stations being connected to said communication network and configured to transmit the first reception data to a remote server via the communication network, the second reception stations being connected to said communication network and configured to transmit the second reception data to said remote server via the communication network, wherein, the remote server is configured to:
- calculate a first geographic position of the signal-transmitting device in the first geographic coverage zone from the first reception data,
- detect that the geographic position of the signal-transmitting device is included in the predefined second geographic zone,
- transmit a transmission instruction signal to the signal-transmitting device, the transmission instruction signal being intended to trigger the transmission of the second radio signal by the signal-transmitting device,
- calculate a second geographic position of the signal-transmitting device in the second geographic zone from the second reception data.

According to one embodiment, the second reception stations are configured to be able to assume an inactive state in which said second reception stations are unable to receive a radio signal at the second frequency transmitted from the second zone or an active state in which said second reception stations are configured to receive a radio signal at the second frequency transmitted from the second geographic zone.

According to one embodiment, the remote server is configured to, prior to the transmission of the transmission instruction signal, transmit an activation signal for the second reception stations.

According to one embodiment, the predefined second geographic zone comprises a plurality of geographic sub-zones, the plurality of second reception stations comprising a plurality of groups of second reception stations, each group of second reception stations being able to receive a radio signal at the second frequency transmitted from a said respective geographic sub-zone.

According to one embodiment, the remote server is configured to detect that the geographic position of the signal-transmitting device is included in a given geographic sub-zone of the plurality of geographic sub-zones and transmit an activation signal for the second reception stations of the group of second reception stations associated with said given geographic sub-zone.

According to one embodiment, the remote server is configured to detect that the geographic position of the signal-transmitting device is situated outside of said given geographic sub-zone and to transmit a deactivation signal for the second reception state of said given group of second reception stations.

According to one embodiment, the remote server is configured to detect that the geographic position of the signal-transmitting device is situated outside of the second geographic zone, and to transmit an end of transmission instruction signal to the signal-transmitting device to interrupt the transmission of the second radio signal at the second frequency by the signal-transmitting device.

According to one embodiment, the remote server is configured to detect that the geographic position of the signal-transmitting device is situated outside of the second geographic zone, and to transmit a deactivation signal for the second reception stations.

According to one embodiment, the invention also provides a signal-transmitting device comprising:
- a first communication module able to transmit a first radio signal at a first frequency,
- a second communication module able to transmit a second radio signal at a second frequency distinct from the first frequency, said second communication module being able to be configured to assume an inactive state in which the signal-transmitting device is able to transmit only the first radio signal or an active state in which the signal-transmitting device is able to transmit the first radio signal and the second radio signal,
- a reception module able to receive a signal instructing transmission of the second radio signal and configured to, on reception of said transmission instruction signal, switch the second communication module from the inactive state to the active state.

According to one embodiment, the reception module is able to receive an end of transmission instruction signal and configured to, on reception of said end of transmission instruction signal, switch the second communication module from the active state to the inactive state.

BRIEF DESCRIPTION OF THE FIGURES

The invention will be better understood, and other aims, details, features and advantages thereof will become more clearly apparent from the following description of several particular embodiments of the invention, given purely in an illustrative and nonlimiting manner, with reference to the attached drawings.

DETAILED DESCRIPTION OF EMBODIMENTS

Figure 1:
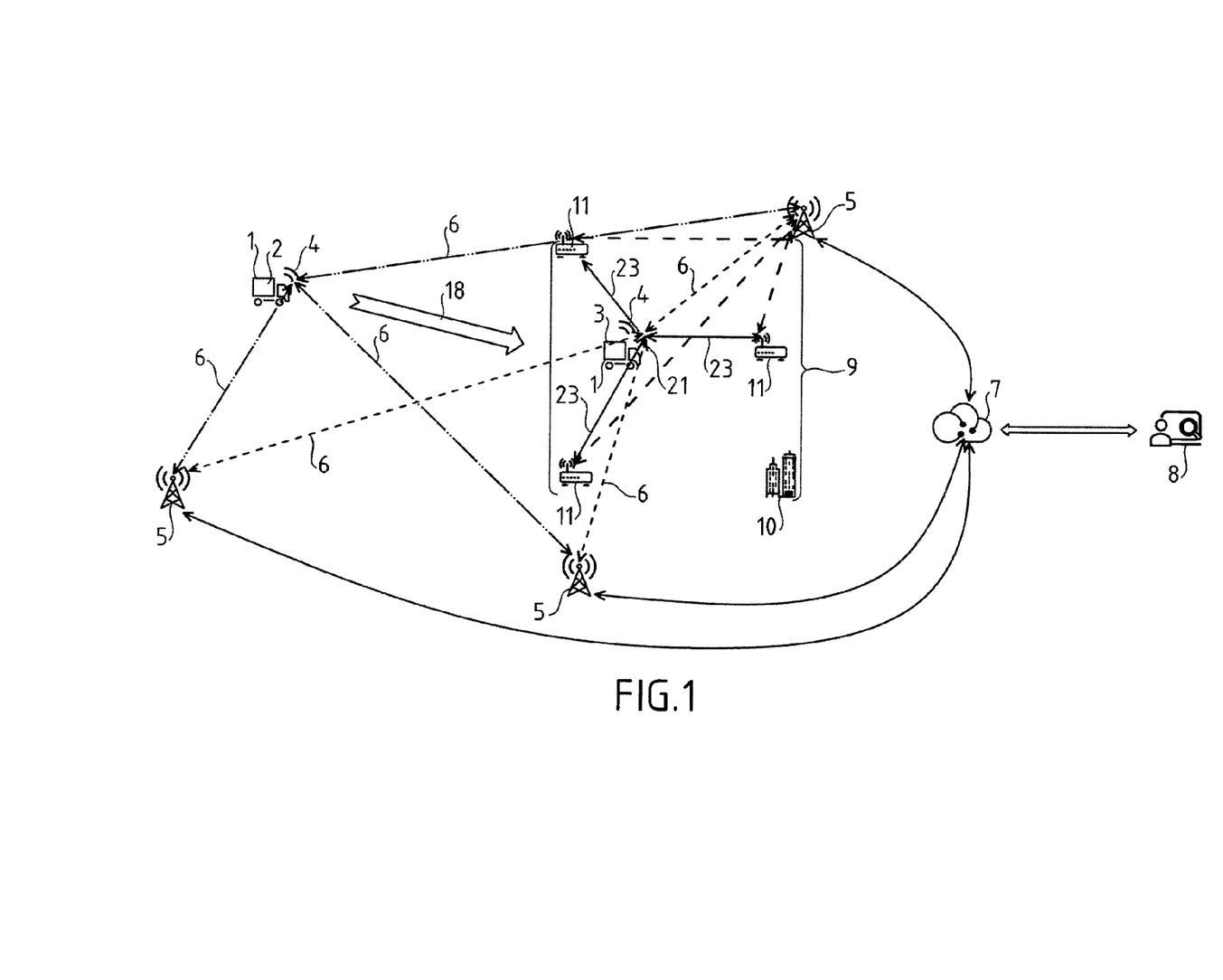
FIG. 1 is a schematic representation of a radio signal-transmitting object in a wide area communication network comprising a plurality of first reception stations, the coverage zone of said wide area communication network comprising a second geographic zone in which a plurality of second reception stations are arranged.

FIG. 1 illustrates a radio signal-transmitting device 1 to be geolocated. Such a device 1 is of any type capable of communicating data via a radio signal, such as, for example, a device 1 belonging to the internet of things. Such a device 1 is equipped with a wireless communication module and can thus communicate measured or calculated data, depending on its characteristics. Such a device 1 belonging to the internet of things has the particular feature of consuming little energy, being commonly qualified as "low consumption", and of using very low bit rate communication means, for example less than 2 Kbps.

The device 1 illustrated in FIG. 1 is geographically mobile. The device 1 is, for example, an identifying device of a container transporting goods. Thus, FIG. 1 illustrates this device 1 moving from a first position 2 to a second position 3. In order to track the movements of the mobile device 1, the latter is geolocated.

In order to limit the complexity and the energy consumption of the signal-transmitting device 1, for example by avoiding the use of a satellite guiding system, it is preferable to geolocate the device 1 by using the radio signals transmitted by said device 1.

Regularly and/or occasionally, the device 1 transmits a first radio signal 4 in order to allow it to be geolocated. This first radio signal 4 is received by a plurality of first stations 5 situated in the region of the device 1, as illustrated by the arrows 6 in FIG. 1. These first stations 5 are connected to a network 7, such as a wide-area communication network of internet or similar type in order to transmit data relating to the first radio signal 4 received to a remote device that is the recipient of said first radio signal 4. In the context of a geolocation system, these first stations 5 are connected via the network 7 to a remote server 8 making it possible to calculate the geographic position of the device 1.

For that, the remote server 8 comprises a location application (for example of LBS type, LBS being the acronym for "Location-Based Service"). The location application makes it possible, when the first radio signal 4 is received by a plurality of first stations 5, to geolocate the signal-transmitting device 1 having transmitted the first radio signal 4. This geolocation can be performed in many ways, for example by a triangulation-based geolocation method based on the time of arrival of the signal at the different stations of TDoA type (TDoA being the acronym for "Time Differential of Arrival"), on the signal quality RSSI (from the acronym "Received Signal Strength Indication") and/or SNR (from the acronym "Signal to Noise Ratio"), on the angle of arrival of the signal at the different stations AoA ("Angle of Arrival") or the like.

Thus, when it receives the first radio signal 4, each first station 5 transmits, to the remote server 8, first reception data of said first radio signal 4. These first reception data of the first signal 4 are, for example, an identifier of the first radio signal 4, a date of reception of the first radio signal 4, information on quality of reception of the first radio signal 4, an angle of reception of the first radio signal 4, an identifier and/or a geographic position of the first station 5 etc. These reception data of the first radio signal 4 thus allow the remote server 8 to calculate the geographic position of the device 1.

Several radio access technologies are available for implementing networks of communication modules. Purely illustrative and nonlimiting examples of technologies that can be cited include LoRa™, Sigfox™ or even WM-Bus ("Wireless Meter Bus"), which rely notably on different modulation types. These technologies have the common feature of offering long range communications which make it possible to reduce the number of stations by increasing the coverage thereof.

FIG. 1 illustrates three first stations 5 using a long range reception technology, the LoraWan technology by way of example hereinafter in the description. Similarly, the signal-transmitting device 1 comprises a first communication module which is configured to transmit the first radio signal 4 according to characteristics suited to the LoraWan technology such the first stations 5 can receive said first radio signal 4. Likewise, the device 1 is able to receive a signal according to characteristics suited to the LoraWan technology by means of the first communication module or of a distinct reception module. Thus, the first stations 5 as illustrated in FIG. 1 using these technologies together define a first geographic coverage zone in which the first radio signal 4 can be received by these first stations 5.

However, the geolocation of the device 1 may require a different degree of accuracy depending on the location of the signal-transmitting device. Thus, the accuracy of geolocation of the device 1 required is different when said device 1 is outside, for example in transit between two countries or remote regions, and when said device 1 is situated inside a building or in a particular zone, for example in a storage depot or at a goods loading dock or of a commercial port.

The degree of accuracy in the geolocation of the device 1 depends, among other things, on the communication technology used between the device 1 and the first stations 5. In fact, the long range communication technologies offer a limited level of accuracy in the geolocation applications. Thus, for example, the LoraWan technology allows a coverage over a distance of fifteen or so kilometers around each station and allows for a geolocation accuracy of the order of fifty or so meters.

Conversely, some technologies allow a significantly higher degree of accuracy but offer a coverage range around the stations that is much more reduced. Thus, for example, the UWB (Ultra WideBand) technology allows a geolocation accuracy of the order of 50 centimeters, but the communication range between a signal-transmitting device and a reception station using this technology is reduced to 10 to 20 meters.

FIG. 1 illustrates a second geographic zone 9 included in the first geographic zone. This second geographic zone 9 is of reduced size compared to the first geographic zone and corresponds to a zone in which the requirements in terms of accuracy of geolocation of the device 1 are greater than in the rest of the first geographic zone. As an example, this second geographic zone can correspond to a zone situated inside a building 10 such as a warehouse or else a predefined outside zone such as the port storage zone.

A plurality of second reception stations 11 are configured to receive a radio signal transmitted from this second geographic zone 9 according to a technology offering the desired degree of geolocation accuracy. In other words, the second geographic zone 9 corresponds to a zone of coverage of a plurality of second stations 11 having a reduced coverage range but allowing for a better geolocation accuracy compared to the first stations 5. For example, the second stations 11 are UWB stations configured to receive a radio signal transmitted from the second geographic zone 9 by using the UWB technology. It is clear that these second reception stations could use another similar technology allowing a suitable degree of accuracy, that is to say greater than the degree of accuracy offered by the first stations 5. Other high-accuracy and low-accuracy wireless location technologies that can be used are described, for example, in the document "A Survey of Indoor Localization Systems and Technologies" by Faheem Zafari, Athanasios Gkelias and Kin K. Leung, published on 4 Sep. 2017 under the reference arXiv:1909.01015v1.

The device 1 advantageously comprises a second communication module which is configured to transmit a second radio signal 21 according to characteristics suited to the UWB technology such that the second stations 11 can receive said second radio signal 21. However, this second communication module can assume an inactive state, in which the device 1 does not transmit the second radio signal 21, or an active state, in which the device 1 transmits the second radio signal 21. In this active state, the second radio signal 21 can be transmitted occasionally or regularly depending on the requirements and the desired configuration of the device 1. Preferably, in order to limit the energy consumption of the device 1, the second module is by default in an inactive state in which it consumes no or little energy.

Figure 2:
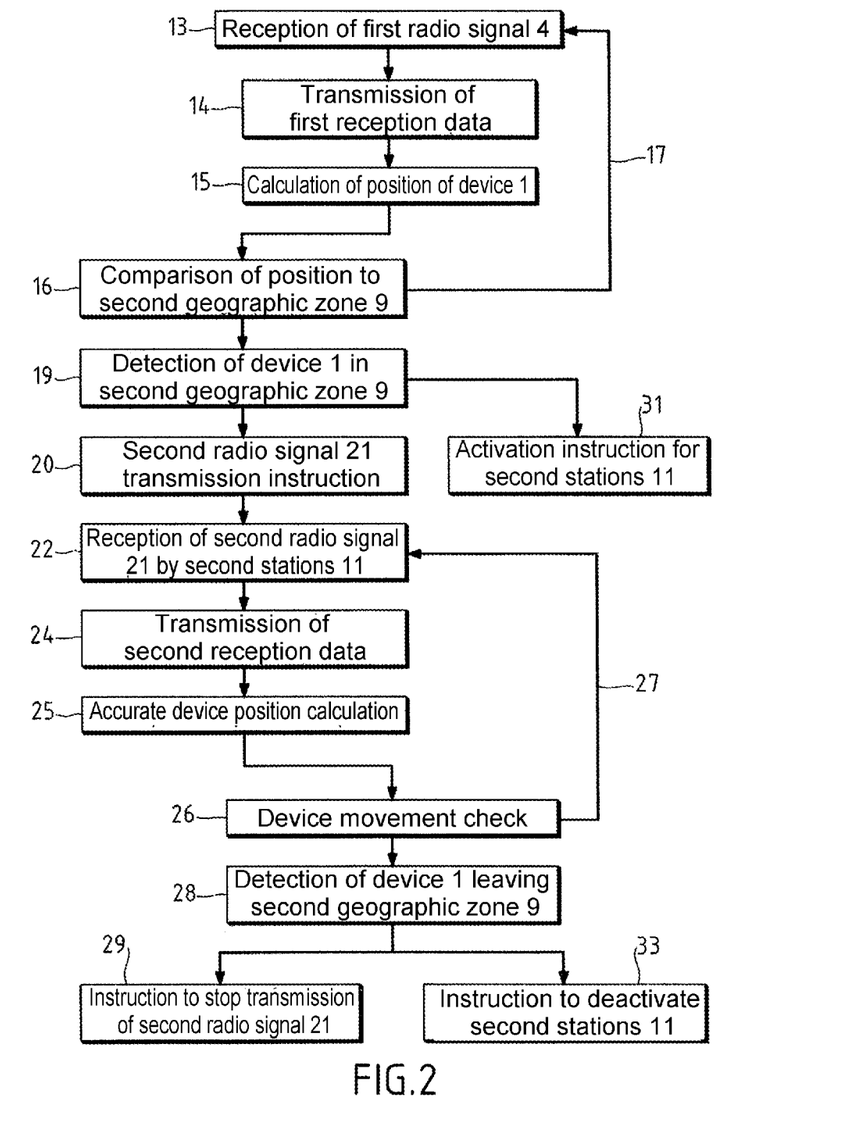
FIG. 2 is a diagram illustrating the successive steps of a method for geolocating the signal-transmitting device of FIG. 1.

FIG. 2 is a diagram illustrating the successive steps of a geolocation method making it possible to geolocate the signal-transmitting device 1 simply and economically with a degree of accuracy suited to the requirements. When the device is in the first position 2 as illustrated in FIG. 1 in which it is situated in the first geographic zone and outside of the second geographic zone 9, the device 1 transmits the first radio signal 4. As explained above, the first radio signal 4 transmitted from this first position 2 is received by the three first stations 5 (step 13). The reception data relating to the reception of the first radio signal 4 by the first stations 5 are transmitted to the remote server (step 14). The remote server 8 then calculates the position of the device 1 from said first radio signal 4 (step 15).

The remote server 8 then compares the calculation position of the device 1 to the coordinates of the second geographic zone 9 (step 16). In other words, the remote server 8 analyzes the calculated position of the device 1 to determine whether the device 1 is situated in the second geographic zone 9 or outside of the second geographic zone 9. For that, the remote server 8 can include or consult a database storing the information relating to the coordinates defining the second geographic zone 9.

If the remote server detects that the device 1 is outside of a zone requiring a high degree of accuracy (step 17), for example, in the case of the first position 2, the remote server 8 continues to await first reception data corresponding to the reception of another first radio signal 4 to analyze whether the device 1 has moved in the second geographic 9 or not. The remote server 8 possibly transmits the calculated position of the device 1 to a third-party device that may require information on the position of the device 1.

If, on the other hand, the device 1 has moved and has entered into the second geographic zone 9, as illustrated by the arrow 18 in FIG. 1, the first radio signal 4 is transmitted from the second geographic zone 9, illustrated by the second position 3 in FIG. 1. Thus, when the remote server compares the calculated position of the device 1 to the coordinates of the second geographic zone 9 (step 16), the remote server 8 detects that the device 1 in this second position 3 is located in the second geographic zone 9 (step 19). Consequently, the remote server 8 transmits an instruction signal to the device 1 commanding the transmission of a UWB signal by the device 1 (step 20).

This instruction signal is advantageously relayed by the first stations 5 to the device 1. Thus, the instruction signal is relayed by the first stations 5 to the device 1, that is to say from its first communication module or from its distinct reception module depending on the radio characteristics corresponding to the technology of the first stations 5, for example the LoraWan technology. The reception by the device 1 of the instruction signal relayed via the first stations 5 does not therefore require the prior activation of the second communication module of said device 1. The second communication module of the device 1 can thus remain inactive until this instruction signal is received, which limits the consumption of the device 1.

When the device 1 receives the instruction signal it activates its UWB radio transmitter, that is to say its second communication module, to transmit a second radio signal 21 conforming to the characteristics of the UWB technology. The activation of the second communication module to transmit the second radio signal 21 according to the UWB technology after the reception of the corresponding instruction signal allows for energy saving in the device 1, the second communication module not consuming energy to transmit the second radio signal 21 as long as it does not receive said instruction signal.

This second radio signal 21 is received by the different second stations 11 (step 22), as illustrated by the arrows 23 in FIG. 1. In a way similar to the first stations 5, the second stations 11 transmit, via the communication network 7, second reception data to the remote server 8 (step 24). These second reception data comprise, for example, a date of reception of the second radio signal 21, an angle of reception of said second radio signal 21, a quality of reception of the second radio signal 21, geographic coordinates of the second station 11, etc. These second reception data are used by the remote server 8 to calculate an accurate position of the signal-transmitting device 1 (step 25), that is to say with a degree of accuracy greater than the position calculated from the first radio signal 4. This accurate position is possibly transmitted or used by the remote server depending on the requirements. For example, the accurate position of the device 1 is transmitted to a stock management application to retrieve, in a sorting center depot, the signal-transmitting device from among a plurality of other objects.

When the device 1 transmits the second radio signal 21, it also continues to transmit, regularly or occasionally, the first radio signal 4. The remote server 8 continues to calculate the position of the device 1 from the first reception data and to compare the position thus calculated from the first reception data to the coordinates of the second geographic zone 9 (step 26). This check on the position of the device 1 via the first reception data (step 26) allows the remote server 8 to check the movement of the device 1 and, in particular, to detect when the device 1 moves out of the second geographic zone 9. As long as the remote server does not detect that the device 1 has left the second geographic zone 9, it continues to check the position of the device 1 via the first reception data in parallel to its calculating of the accurate position of the device 1 via the second reception data (step 27).

When the remote server 8 detects that the device 1 has moved into a position situated outside of the second geographic zone 9 (step 28), the remote server 8 transmits a UWB instruction signal to stop transmission to the device 1 (step 29), this stop instruction signal being, for example, relayed by the first stations 5. In fact, since the device 1 has left the second geographic zone 9, it is no longer located in the coverage zone of the second stations 11 such that said second stations 11 can no longer receive the second radio signal 21 and transmit, to the remote server 8, second reception data allowing a calculation of the accurate position of the device 1. On reception of the UWB instruction signal to stop transmission, the device 1 deactivates its second communication module transmitting in UWB mode and stops transmitting the second radio signal 21 in order to save energy on said device 1.

In a preferential embodiment, in a way similar to the second communication module transmitting in UWB mode of the device 1, the second stations 11 can assume an active state in which they are able to receive a UWB radio signal or an inactive state in which they are unable to receive such a radio signal in UWB mode and therefore consume less energy. Thus, the second stations 11 are, by default, in the state in order to reduce their energy consumption. The second stations 11 are, however, in this inactive state, listening for the radio signals using the communication technology of the first stations 5 with the device 1, typically the Lora technology.

When the remote server detects that the device 1 is in the second geographic zone (step 19), it sends an activation signal to the second stations 11 (step 31). This activation signal can be sent prior to or simultaneously with the UWB transmission instruction signal to the device 1. This signal can even be a signal in common with the UWB mode transmission instruction signal to the device 1, transmitted via the first stations 5.

When they receive this activation signal, the second stations 11 switch to a UWB active listening state allowing them to pick up the second signal 21 transmitted in the second geographic zone 9.

Conversely, when the remote server 8 detects that the device 1 leaves the second geographic zone 9 (step 28), it then sends a deactivation signal to the second stations 11 (step 33). On reception of this deactivation signal, the second stations 11 switch from the active state to the inactive state in order to reduce their energy consumption.

Figure 3:
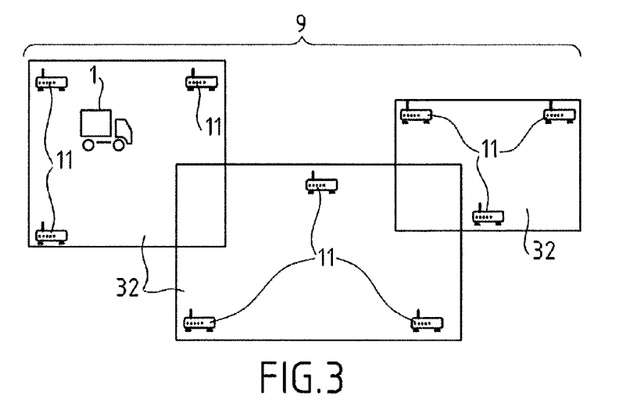
FIG. 3 is a schematic representation of the signal-transmitting device of FIG. 1 circulating in a second geographic zone subdivided into a plurality of geographic sub-zones, a group of second stations being arranged in each of said geographic sub-zones.

FIG. 3 illustrates a variant embodiment in which the second geographic zone is divided into a plurality of sub-zones 32. These sub-zones 32 are joined pairwise, possibly with a common coverage portion. Each sub-zone 32 is associated with a given group of second stations 11 of the plurality of second stations 11 covering the second geographic zone 9. The second stations 11 of the different groups of second stations 11 are by default in an inactive state. When the remote server 8 detects that the device 1 is in the second geographic zone 9 (step 19), it compares the position of the device 1 calculated from the first reception data to the geographic coordinates of the different sub-zones 32. In a way similar to the coordinates of the second geographic zone 9, the coordinates of the different sub-zones 32 which make up the second geographic zone 9 are stored in a database. The remote server 8 then determines the given sub-zone 32 in which the device 1 is located. The activation signal of the second stations 11 (step 31) is sent to only the second stations 11 associated with the determined sub-zone 32.

When the remote server 8 checks the position of the device 1 (step 26), the remote server checks whether the device 1 has moved or not into a new sub-zone 32. If the remote server 8 detects that the device has entered into a new sub-zone 32, it then sends an activation signal to the second stations 11 associated with this new sub-zone 32. Likewise, when the remote server 8 detects that the device 1 has moved out of a sub-zone 32 in which the associated group of second stations 11 was previously activated, the remote server 8 sends a deactivation signal to said group of second stations 11.

The geolocation system described above allows for the geolocation on a large scale, that is to say at a great distance but with reduced accuracy via the first stations 5, and on a reduced scale, that is to say at short range but with increased accuracy, via the second stations 11 depending on the degrees of geolocation accuracy required. Such a system makes it possible to achieve the desired degree of geolocation accuracy with an inexpensive infrastructure that is simple to install and of low consumption. In particular, this system allows for great geolocation accuracy in predetermined zones without requiring a satellite guidance system (GPS) incorporated in the signal-transmitting device 1.

Figure 4:
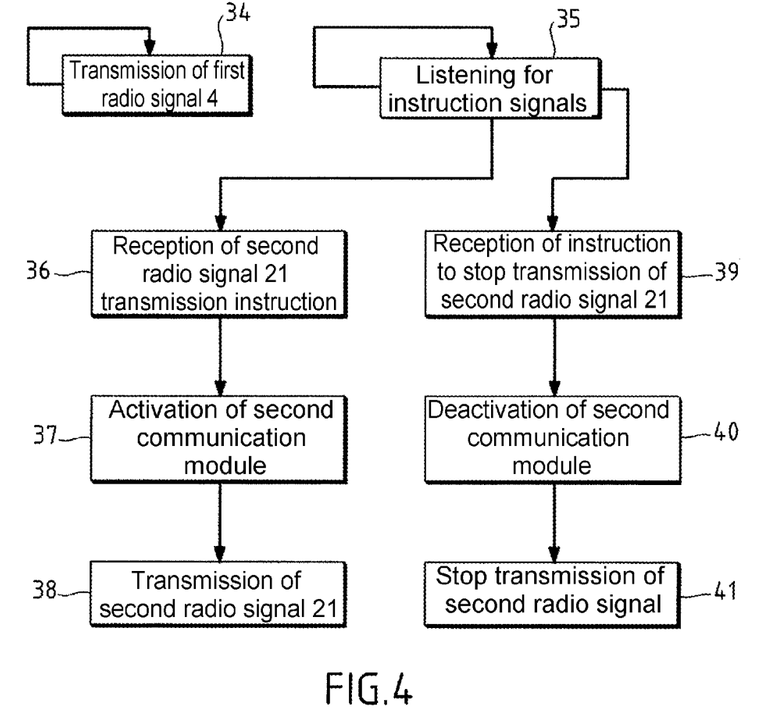
FIG. 4 is a diagram illustrating the successive steps implemented by the signal-transmitting device during the geolocation thereof.

FIG. 4 illustrates a diagram illustrating the successive steps implemented by the signal-transmitting device during its geolocation.

As indicated above, the signal-transmitting device 1 comprises a first communication module configured to transmit the first radio signal 4 at a first frequency and a second communication module configured to transmit the second radio signal 21 at a second frequency distinct from the first frequency. In order to save energy, the second communication module is inactive by default.

The device 1 transmits, regularly or on request, the first radio signal 4 (step 34). As explained above, this first radio signal makes it possible to geolocate the device 1.

The first communication module or a reception module independent of the first communication module is also configured to continuously listen for the instruction radio signals intended for the device 1 (step 35).

When the device 1 receives the transmission instruction signal (step 36), the device 1 activates the second communication module (step 37). Consequently, the device 1 transmits, occasionally or regularly, the second radio signal 21 (step 38) while continuing to transmit the first radio signal 4 (step 34).

Likewise, when the device 1 receives an end transmission instruction signal (step 39), the device 1 deactivates the second communication module (step 40) and ceases transmitting the second radio signal 21 (step 41) and continues to transmit the first radio signal (4) alone.

Although the invention has been described in relation to several particular embodiments, it is clearly obvious that it is in no way limited thereto and that it encompasses all the technical equivalents of the means described and their combinations provided the latter fall within the framework of the invention.

Some of the elements represented, notably the components of the gateway or the communication and/or reception modules of the signal-transmitting device, can be produced in different forms, individually or distributed, by means of hardware and/or software components. Hardware components that can be used are the application-specific integrated circuits ASIC, the programmable logic arrays FPGA or microprocessors. Software components can be written in various programming languages, for example C, C++, Java or VHDL. This list is not exhaustive.

Use of the verb "comprise", or "include" and its conjugated forms does not preclude the presence of elements or steps other than those stated in a claim.

In the claims, any reference symbol between brackets should not be interpreted as a limitation on that claim.

The invention claimed is:

1. A method for geolocating a signal-transmitting device (1), the geolocation method comprising:
supplying first reception data (14), said first reception data resulting from the reception (13) by a plurality of first reception stations (5) of a first radio signal (4) transmitted at a first frequency by the signal-transmitting device (1), said first reception stations (5) defining a first geographic coverage zone,
calculating (15) a first geographic position of the signal-transmitting device (1) in the first geographic coverage zone from the first reception data,
detecting (19) that the geographic position of the signal-transmitting device (1) is included in a predefined second geographic zone (9) by comparing (16) the calculated first geographic position of the signal-transmitting device to the coordinates of the second geographic zone (9), the second geographic zone (9) being included in the first geographic coverage zone,
transmitting (20) a transmission instruction signal to the signal-transmitting device (1) in response to the detection that the geographic position of the signal-transmitting device is in the second geographic zone, the transmission instruction signal being intended to trigger the transmission of a second radio signal (21) at a second frequency distinct from the first frequency by the signal-transmitting device (1), said first frequency being lower than the second frequency,
supplying second reception data (24), said second reception data resulting from the reception (22) of the second radio signal (21) by a plurality of second reception stations (11), said second reception stations (11) being able to receive a radio signal at the second frequency transmitted from the second geographic zone (9), and
calculating (25) a second geographic position of the signal-transmitting device (1) in the second geographic zone (9) from the second reception data.

2. The geolocation method as claimed in claim 1, wherein, prior to the transmission (20) of the transmission instruction signal, the second reception stations (11) are in an inactive state in which said second reception stations (11) are unable to receive a radio signal at the second frequency transmitted from the second zone (9), the method further comprising, prior to the transmission (20) of the transmission instruction signal:
transmitting (31) an activation signal for the second reception stations (11) to activate the second reception stations (11) so that said second reception stations (11) are configured to receive a radio signal at the second frequency transmitted from the second geographic zone (9).

3. The geolocation method as claimed in claim 1, wherein:
the predefined second geographic zone (9) comprises a plurality of geographic sub-zones (32),
the plurality of second reception stations (11) comprises a plurality of groups of second reception stations (11), each group of second reception stations (11) being able to receive a radio signal at the second frequency transmitted from one said respective geographic sub-zone (32),
and wherein
the step of detecting (19) that the geographic position of the signal-transmitting device (1) is included in the predefined second geographic zone (9) comprises detecting that the geographic position of the signal-transmitting device (1) is included in a given geographic sub-zone (32) of the plurality of geographic sub-zones (32),
the second reception data result from the reception of the second radio signal (21) by a given group of second reception stations (11) able to receive a radio signal transmitted at the second frequency in said given geographic sub-zone (32).

4. The geolocation method as claimed in claim 3, wherein, prior to the transmission (20) of the transmission instruction signal, the second reception stations (11) are in an inactive state in which said second reception stations (11) are unable to receive a radio signal at the second frequency transmitted from the second geographic zone (9), the method further comprising, prior to the transmission (19) of the transmission instruction signal and after the detection that the geographic position of the signal-transmitting device (1) is included in the given geographic sub-zone (32):
transmitting an activation signal for the second reception stations (11) of the given group of second reception stations (11) so that said second reception stations (11) are configured to receive the second radio signal (21) at the second frequency.

5. The geolocation method as claimed in claim 4, further comprising, after the calculation of the second geographic position of the signal-transmitting device (1):
detecting that the geographic position of the signal-transmitting device (1) is situated outside of said given geographic sub-zone (32),
transmitting a deactivation signal for the second reception stations (11) of the given group of second reception stations (11) so that said second reception stations (11) are rendered inactive.

6. The geolocation method as claimed in claim 1, further comprising, after the calculation (25) of the second geographic position of the signal-transmitting device (1):
detecting (28) that the geographic position of the signal-transmitting device (1) is situated outside of the second geographic zone (9),
transmitting (29) an end of transmission instruction signal to the signal-transmitting device (1) to interrupt the transmission of the second radio signal (21) at the second frequency by the signal-transmitting device (1).

7. The geolocation method as claimed in claim 1, further comprising:
detecting (28) that the geographic position of the signal-transmitting device (1) is situated outside of the second geographic zone (9),
transmitting (33) a deactivation signal for the second reception stations (11) so that said second reception stations (11) are inactive.

8. The geolocation method as claimed in claim 1, wherein the reception data of the first signal comprise, for each first reception station (5) having received the first radio signal, a datum of identification of said first radio signal (4), a datum of date of reception of said first radio signal (4) and a datum of position of said first reception station (5).

9. The geolocation method as claimed in claim 8, wherein the reception data of the first radio signal (4) further comprise a datum of intensity of reception of said first radio signal (4).

10. The geolocation method as claimed in claim 1, wherein the reception data of the second signal comprise, for each second reception station (11) of the plurality of second reception stations (11) having received the second radio signal (21), a datum of identification of said second radio signal (21), a datum of date of reception of said second radio signal (21) and a datum of position of the second reception station (11).

11. The geolocation method as claimed in claim 10, wherein the reception data of the second radio signal (21) further comprise, for each second reception station (11), an angle of reception and an intensity of reception of said second radio signal (21).

12. The geolocation method as claimed claim 1, wherein the first radio signal (4) is a frame of a LoRaWan communication protocol.

13. The geolocation method as claimed in claim 1, wherein the second radio signal (21) is a frame of a UWB communication protocol.

14. A system for geolocating a signal-transmitting device (1), the geolocation system comprising:
- a plurality of first reception stations (5), said first reception stations (5) defining a first geographic coverage zone, said first reception stations (5) being configured to receive a first radio signal (4) transmitted by the signal-transmitting device (1) at a first frequency and from the first geographic coverage zone, the first reception stations (5) being configured to generate the first reception data resulting from the reception of said first radio signal (4),
- a plurality of second reception stations (11), said second reception stations (11) being configured to receive a second radio signal (21) transmitted by the signal-transmitting device (1) at a second frequency distinct from the first frequency and from a predefined second geographic zone (9), the second geographic zone (9) being included in the first geographic coverage zone, the second reception stations (11) being configured to generate second reception data resulting from the reception of the second radio signal (21),
- a communication network (7), the first reception stations (5) being connected to said communication network (7) and configured to transmit the first reception data to a remote server (8) via the communication network (7), the second reception stations (11) being connected to said communication network (7) and configured to transmit the second reception data to said remote server (8) via the communication network (7), wherein, the remote server (8) is configured to:
- calculate a first geographic position of the signal-transmitting device (1) in the first geographic coverage zone from the first reception data,
- detect that the geographic position of the signal-transmitting device (1) is included in the predefined second geographic zone (9) by comparing (16) the first geographic position of the signal-transmitting device calculated at the coordinates of the second geographic zone (9),
- transmit a transmission instruction signal to the signal-transmitting device (1) in response to the detection that the geographic position of the signal-transmitting device is in the second geographic zone, the transmission instruction signal being intended to trigger the transmission of the second radio signal (21) by the signal-transmitting device (1),
- calculate a second geographic position of the signal-transmitting device (1) in the second geographic zone (9) from the second reception data.

\* \* \* \* \*